United States Patent
Sendonaris et al.

(10) Patent No.: US 9,998,874 B2
(45) Date of Patent: Jun. 12, 2018

(54) ALTITUDE-BASED INDOOR OR OUTDOOR DETECTION

(71) Applicant: NextNav, LLC, Sunnyvale, CA (US)

(72) Inventors: Andrew Sendonaris, Los Gatos, CA (US); Arun Raghupathy, Bangalore (IN); Deepak Joseph, Oakton, VA (US)

(73) Assignee: NextNav, LLC, Sunnyvale, CA (US)

( * ) Notice: Subject to any disclaimer, the term of this patent is extended or adjusted under 35 U.S.C. 154(b) by 18 days.

(21) Appl. No.: 15/276,486

(22) Filed: Sep. 26, 2016

(65) Prior Publication Data

US 2017/0094471 A1   Mar. 30, 2017

Related U.S. Application Data

(60) Provisional application No. 62/233,952, filed on Sep. 28, 2015.

(51) Int. Cl.
| | |
|---|---|
| *H04W 4/02* | (2018.01) |
| *G01S 5/02* | (2010.01) |
| *H04W 4/04* | (2009.01) |
| *G01C 5/06* | (2006.01) |
| *G01S 19/42* | (2010.01) |

(52) U.S. Cl.
CPC .............. *H04W 4/025* (2013.01); *G01C 5/06* (2013.01); *G01S 5/0252* (2013.01); *G01S 19/42* (2013.01); *H04W 4/04* (2013.01)

(58) Field of Classification Search
CPC .......... H04W 4/02; H04W 4/025; H04W 4/04
See application file for complete search history.

(56) References Cited

U.S. PATENT DOCUMENTS

| | | | | |
|---|---|---|---|---|
| 2009/0043504 A1* | 2/2009 | Bandyopadhyay | .... | G01C 17/38 701/469 |
| 2010/0204877 A1* | 8/2010 | Schwartz | ................ | B60R 25/00 701/31.4 |
| 2013/0289871 A1* | 10/2013 | Itagaki | ............... | G01C 21/3676 701/410 |
| 2014/0274151 A1* | 9/2014 | Pattabiraman | ........ | H04W 4/043 455/456.3 |
| 2015/0309183 A1* | 10/2015 | Black | .................... | G01S 19/258 342/357.25 |

(Continued)

OTHER PUBLICATIONS

Form PCT/ISA/220, PCT/US2016/053814, "Notification of Transmittal of the International Search Report and the Written Opinion of the International Searching Authority, or the Declaration", 1 page(s); Form PCT/ISA/210, PCT/US2016/053814, "International Search Report ", 6 page(s); EPO Form PO4A42, 1 page(s); Form PCT/ISA/237, PCT/US2016/053814, "Written Opinion of the International Searching Authority", 12 page(s). dated Feb. 21, 2017.

(Continued)

*Primary Examiner* — Kamran Afshar
*Assistant Examiner* — Farideh Madani

(57) ABSTRACT

Using estimates of a receiver's altitude to determine where a receiver is located and to refine a positioning system's estimate of a receiver's position. Systems and methods determine whether a receiver is inside or outside a building, and may use the determination to confirm or adjust an initial estimate of the receiver's position. Various approaches for making the determination and for assessing the initial estimate of the receiver's position are described.

28 Claims, 7 Drawing Sheets

(56) References Cited

U.S. PATENT DOCUMENTS

2015/0362921 A1* 12/2015 Hanaoka ............... G01B 11/24
701/23

OTHER PUBLICATIONS

Form PCT/ISA/206, PCT/US2016/053814, "Invitation to pay additional fees and, where applicable, protest fee", 6 pages, EPO Form P04A42, PCT/US2016/053814, "Information on Search Strategy", 1 page, dated Dec. 14, 2016.

* cited by examiner

US 9,998,874 B2

ALTITUDE-BASED INDOOR OR OUTDOOR DETECTION

FIELD

This disclosure relates to improving an estimated position of a receiver using altitude-based indoor/outdoor detection.

BACKGROUND

Determining the exact location of a receiver in an environment can be quite challenging, especially when the receiver is located in an urban environment, or is located within a building. Imprecise estimates of the receiver's position may delay emergency personnel response times, or can negatively impact efforts to provide navigation to a desired destination. Positioning systems that transmit positioning signals used to estimate the position of a receiver are well known. Unfortunately, poor signal conditions found in urban and indoor environments often lead to estimates of receiver positions that indicate the receivers are indoors when the receivers are outdoors, or that indicate the receivers are outdoors when the receivers are indoors. Thus, solutions are needed to improve estimates of receiver positions, especially in urban areas or indoor environments.

DETAILED DESCRIPTION

When a receiver is in an urban environment, estimates of that receiver's position using positioning signals from satellite or terrestrial positioning systems often lack accuracy due to multi-path delays of the positioning signals. Such delays may result in an incorrect estimate of the receiver's position such that the estimated position may imply that the receiver is located outside a building instead of inside the building, or that the receiver is located inside a building instead of outside the building. Thus, determining the likelihood that the receiver is inside or outside a building can improve the accuracy of an estimated position.

Embodiments for using an estimate of a receiver's position to determine if a receiver is inside or outside a building are described below. Embodiments for improving the estimated position of the receiver based on whether the receiver is determined to be inside or outside the building are also described. Attention is initially drawn to examples of systems that may be used to determine if a receiver is inside or outside a building, or to refine an estimated position of the receiver based on whether the receiver is determined to be inside or outside the building.

Figure 1:
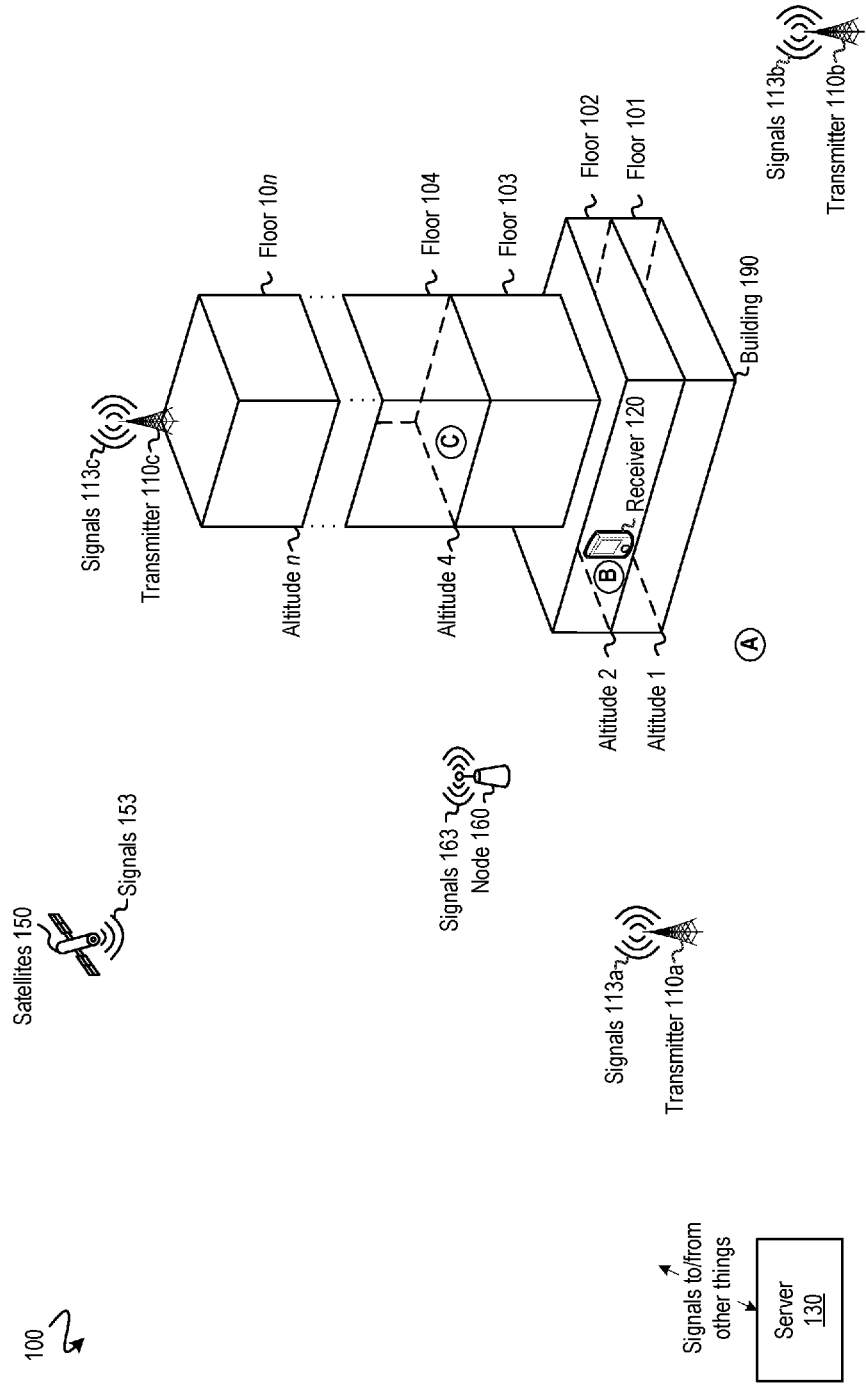
FIG. 1 illustrates an operational environment for determining whether a receiver is inside or outside a building, and for improving an estimate of the receiver's position using the determination.

An operational environment for determining whether a receiver is inside or outside a building, and for improving an estimate of the receiver's position using the determination is illustrated in FIG. 1.

The operational environment contains a positioning system 100 that includes a network of terrestrial transmitters 110 and any number of receivers, including a receiver 120. The receiver 120 may be in the form of a computing device (e.g. a mobile phone, tablet, laptop, digital camera, tracking tag, or other), and, in some embodiments, the receiver 120 may take the form of any component of the computing device, including a processor.

The transmitters 110 and the receiver 120 may be located at different altitudes or depths that are inside or outside various manmade or natural structures 190. Signals 113, 153 and 163 are exchanged between the receiver 120 and the transmitters 110, satellites 150, and/or other nodes 160 using known wireless or wired transmission technologies. For example, the transmitters 110 may transmit the signals 113 using one or more common multiplexing parameters—e.g. time slot, pseudorandom sequence, or frequency offset.

Attention is now drawn to examples of methods for determining if a receiver is inside or outside a building, and for improving an estimated position of the receiver based on whether the receiver is determined to be inside or outside the building.

Figure 2:
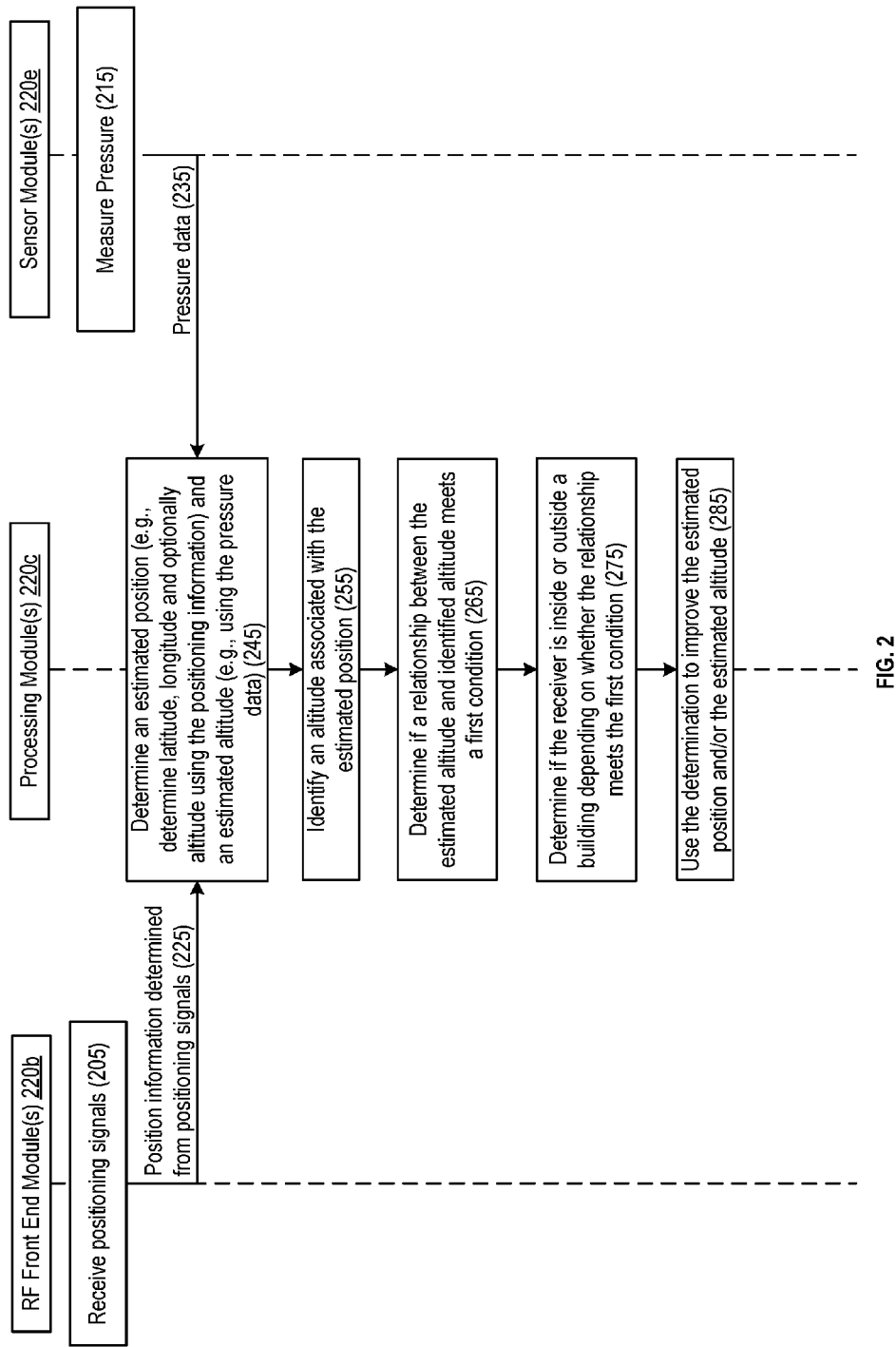
FIG. 2 illustrates functional details for determining whether a receiver is inside or outside a building, and for improving an estimate of the receiver's position using the determination.

Functional details for determining whether the receiver is inside or outside a building, and for improving an estimate of the receiver's position based on that determination are shown in FIG. 2. Details of particular steps of FIG. 2 are discussed later with reference to FIG. 3, FIG. 4 and FIG. 5.

By way of example, a receiver may include any of the following components: antenna module(s) 220a for exchanging signals with other systems (e.g. satellites, terrestrial transmitters, receivers); RF front end module(s) 220b with circuitry components (e.g. mixers, filters, amplifiers, digital-to-analog and analog-to-digital converters as is known in the art or otherwise disclosed herein); processing module(s) 220c for signal processing of received signals to determine position information (e.g. times of arrival or travel time of received signals, atmospheric information from transmitters, and/or location or other information associated with each transmitter), for using the position information to compute an estimated position of the receiver, for performing methods described herein, and/or for performing other processing; memory module(s) 220d for providing storage and retrieval of data and/or instructions relating to methods of operation described herein that may be executed by the processing module(s) or other module(s); sensor module(s) 220e for measuring environmental conditions at the receiver (e.g. pressure, temperature, humidity, wind), which may be compared to the same environmental conditions at transmitters to determine the altitude of the receiver;

other sensor module(s) for measuring other conditions (e.g. acceleration, velocity, orientation, light, sound); interface module(s) for exchanging information with other systems via other links other than a radio link; and/or input/output module(s) for permitting a user to interact with the receiver. As is known, processing by the receiver can also occur at a server (e.g. the server 130 of FIG. 1).

As shown in FIG. 2, the RF interface module 220b receives positioning signals at step 205. The positioning signals may have originated from one or more of a satellite-based positioning system 150, a node-based (e.g. cellular) positioning system 160, a terrestrial positioning system 110, a wireless beacon (e.g. a Wi-Fi access point, a Bluetooth beacon), or elsewhere.

A sensor of the sensor module(s) 220e generates a measurement of atmospheric pressure at step 215. Another sensor of the sensor module(s) 220e may generate a measurement of atmospheric temperature.

The processing module(s) 220c receives position information and the atmospheric pressure data at steps 225 and 235. The processing module(s) 220c uses one or more of the positioning information and/or the atmospheric data during step 245 to determine an estimated altitude and an estimated two or three-dimensional position of the receiver 120. Using a measurement of atmospheric pressure to determine an estimated altitude of a receiver is well known in the art and may employ a formula of the form:

$$h = \frac{RT}{gM} \ln\left(\frac{P_{sea\text{-}level}}{P_{user}}\right).$$ (Equation 1)

Equation 1 may be used to determine an altitude estimate, h, given the specific gas constant of air R, the acceleration due to gravity g, the molar mass of air M, a measured or estimated reference pressure $P_{sea\text{-}level}$, a measured or estimated temperature T, and the measured atmospheric pressure $P_{user}$. Of course, other known means for determining altitude can be used.

At step 255, the processing module(s) 220c identifies an altitude associated with the estimated position of the receiver 120. For example, the identified altitude may be the altitude of a floor of a building located within a horizontal range of the estimated position of the receiver. Alternatively, the identified altitude could be an arbitrary altitude. Details of identifying an altitude associated with an estimated position are discussed with respect to FIG. 3.

Next, at step 265, the processing module(s) 220c determines if a relationship between the estimated altitude of the receiver 120 and the identified altitude meets a first condition. For example, the identified altitude may be used to generate a threshold altitude and the first condition is whether the estimated altitude exceeds the identified altitude.

The processing module(s) 220c uses the determination from step 265 to determine if the receiver 120 is inside or outside a building at step 275.

The determination of step 275 is used to improve the estimated position and/or estimated altitude of the receiver 120 at step 285. Details of this step are discussed later with reference to FIG. 7 and FIG. 8.

As previously mentioned, the processing module(s) 220c determines if the relationship between the estimated altitude and the identified altitude meets a first condition during step 265. Three examples of possible conditions are discussed below with reference to FIG. 3, FIG. 4 and FIG. 5.

Condition 1: Comparing Altitude Difference to a Threshold Value

Figure 3:
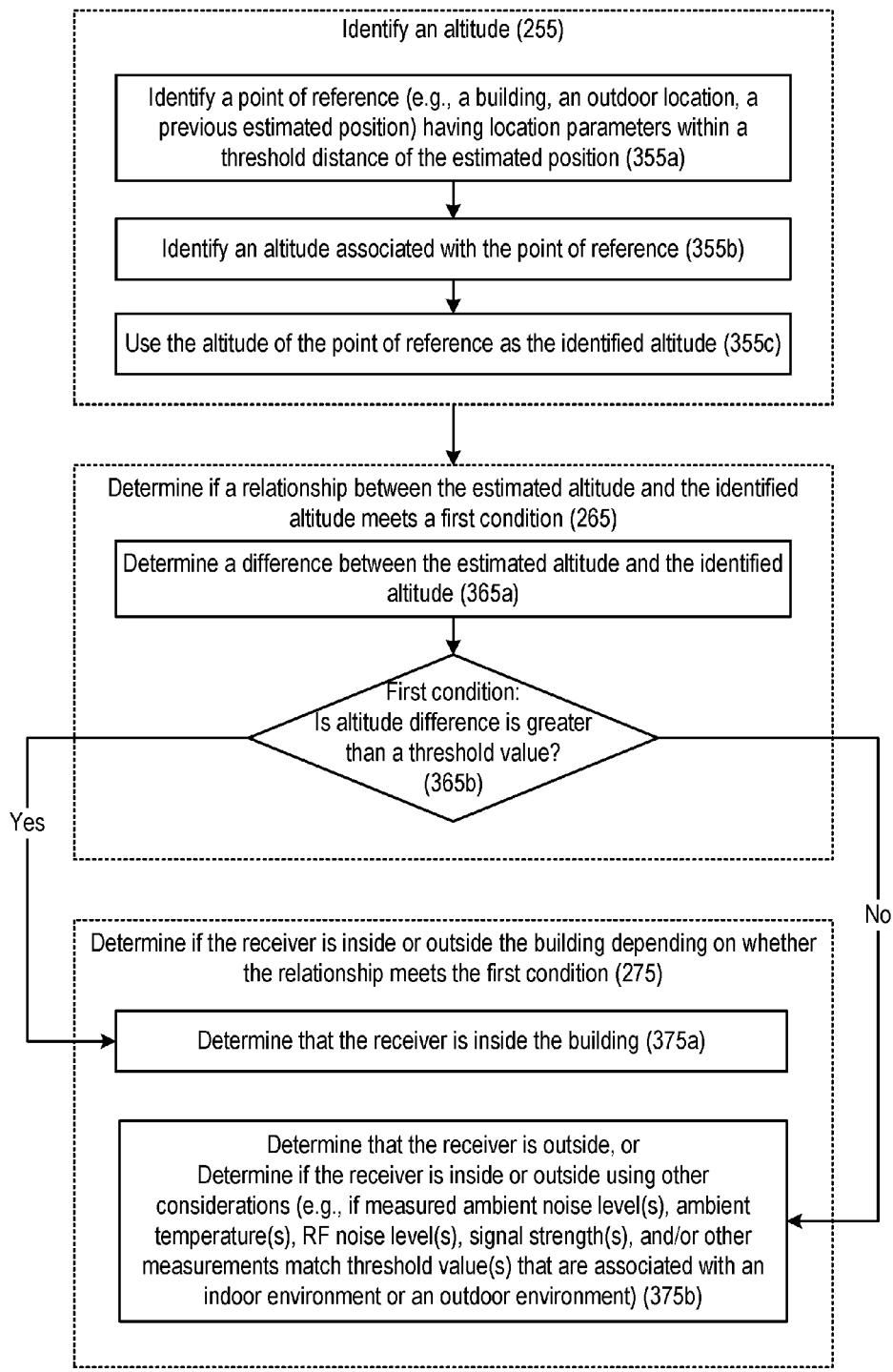
FIG. 3 illustrates functional details for determining if a receiver is inside or outside a building by comparing a difference in altitude between an estimated altitude and an identified altitude associated with a building to a predetermined threshold.

FIG. 3 illustrates functional details for determining if a receiver is inside or outside a building by comparing a predetermined threshold to a difference in altitude between an estimate altitude and an identified altitude associated with a building.

Steps 355a, 355b, and 355c depict one embodiment of identifying an altitude associated with a point of reference (e.g. a building, an outdoor location, a location associated with a previous estimated position, or another location). The steps of the process occur at step 255 of FIG. 2, and include: identifying a point of reference having location parameters within a threshold distance of the estimated position (step 355a); identifying an altitude associated with the point of reference (step 355b); and using the altitude of the point of reference as the identified altitude (step 355c).

By way of example, the identified altitude may correspond to the ground-floor elevation of a building, a different floor of the building, a location within the building (e.g. a definable area like a venue or a room), the altitude of a basement below ground level, or another value. The identified altitude may be generated using one of the following: a previous measurement of altitude by the receiver 120, a measurement of altitude by another receiver, a surveying technician, a topographical map, blueprints of a building, a predictive model, a location of a beacon emitting a signal that was received by the receiver 120, or other approaches.

The receiver 120 can receive the identified altitude from the server 130, from the memory module(s) 220d, from another receiver, or from another source.

After an altitude is identified, a process for determining whether a relationship between the estimated altitude and the identified altitude meets a first condition occurs at steps 365a and 365b. This process includes the steps of: determining a difference between the estimated altitude and the identified altitude (step 365a); and determining if the altitude difference is greater than a threshold value (step 365b). That is, if the estimated altitude is sufficiently above (e.g. above, or more than an error value above) the altitude of the identified altitude (e.g. the ground floor of the building, or street level of an area), it may be concluded that the receiver is inside a building (since it is higher than ground floor/street level).

To elaborate, with reference to FIG. 1, an estimated position of the receiver 120a may indicate that the receiver 120a is at the location designated as 'A' (in front of the building 190) even though the receiver 120a is actually at the location designated as 'B' (inside the building 190 on the second floor 102). By comparing a difference between the measured altitude of the receiver 120a ("altitude 2") and an identified altitude (e.g. the altitude at which the first floor begins, "altitude 1") to a predetermined threshold, it may be determined that the receiver 120a is actually inside the building and not at the location designated as 'A'.

A basic equation describing the above approach is the following:

If ($altitude_{est} - altitude_{Id}$) > θ, declare receiver 'indoors'  (Equation 2)

where $altitude_{est}$ is the altitude estimate, $altitude_{Id}$ is the identified altitude, and θ is a predetermined threshold used to determine within some predefined certainty that the receiver 120 inside a building.

In one embodiment, the threshold θ is determined as a function of the expected error to mitigate false positives. In another embodiment, the threshold θ may be set to another value or zero. Altimeter sensors (e.g. an altimeter of the sensor module(s) 220e) that rely upon measured atmospheric pressure to produce altitude estimates may produce altitude estimates with some expected error in the form of a vertical offset from the "true" altitude of the receiver. Such vertical offsets could cause a receiver to incorrectly determine that it is inside a building when using the approach described above.

Altimeters can be characterized in terms of a cumulative distribution function (CDF) of the expected altitude error, as is known in the art. For example, a particular type/brand of altimeter may exhibit the following error statistics:

| Percentile: | 50% | 68% | 80% | 90% | 95% | 100% |
|---|---|---|---|---|---|---|
| Altitude Error less than: | 1 m | 2 m | 3 m | 4 m | 5 m | 10 m |

As shown, 100% of such altimeters will have an expected error of less than 10 m, 95% of such altimeters will have an expected error of less than 5 m, 90% of such altimeters will have an expected error of less than 4 m, and so on.

Thus, if it is required that the inside/outside state of the receiver 120 be determined with 90% certainty, and it is estimated that the second story of a building is associated with altitudes higher than 3.5 meters, then the threshold should be selected to be θ=4 m to mitigate false positives.

Having determined whether the relationship between the estimated altitude and the identified altitude meets the first condition, steps 375a and 375b detail a process for deciding if the receiver 120 is inside or outside the building. The steps of this process include: deciding that the receiver 120 is inside a building if the first condition was met (step 375a); and deciding, if the first condition was not met, that the receiver 120 is outside the building (in one embodiment), or deciding if the receiver 120 is inside or outside the building using other considerations (in another embodiment) (step 375b).

Other considerations may include: if measured ambient noise level(s), ambient atmospheric condition(s) (e.g. temperature, humidity, etc.), RF noise level(s), signal strength (s), and/or other measurements match corresponding threshold value(s) of ambient noise level(s), ambient atmospheric condition (s), RF noise level(s), signal strength(s), and/or other expected characteristics identified for an indoor environment or an outdoor environment.

The above steps may also employ hysteresis to determine an indoor or outdoor location. For example, if a previous determination concluded that the receiver 120 is inside a building, the threshold value used for the next determination may be lower since it is more likely that the receiver 120 is still inside the building. Likewise, if a previous determination concluded that the receiver 120 is outside a building, the threshold value used for the next determination may be higher.

Condition 2: Comparing an Estimated Altitude to an Identified Altitude

Figure 4:
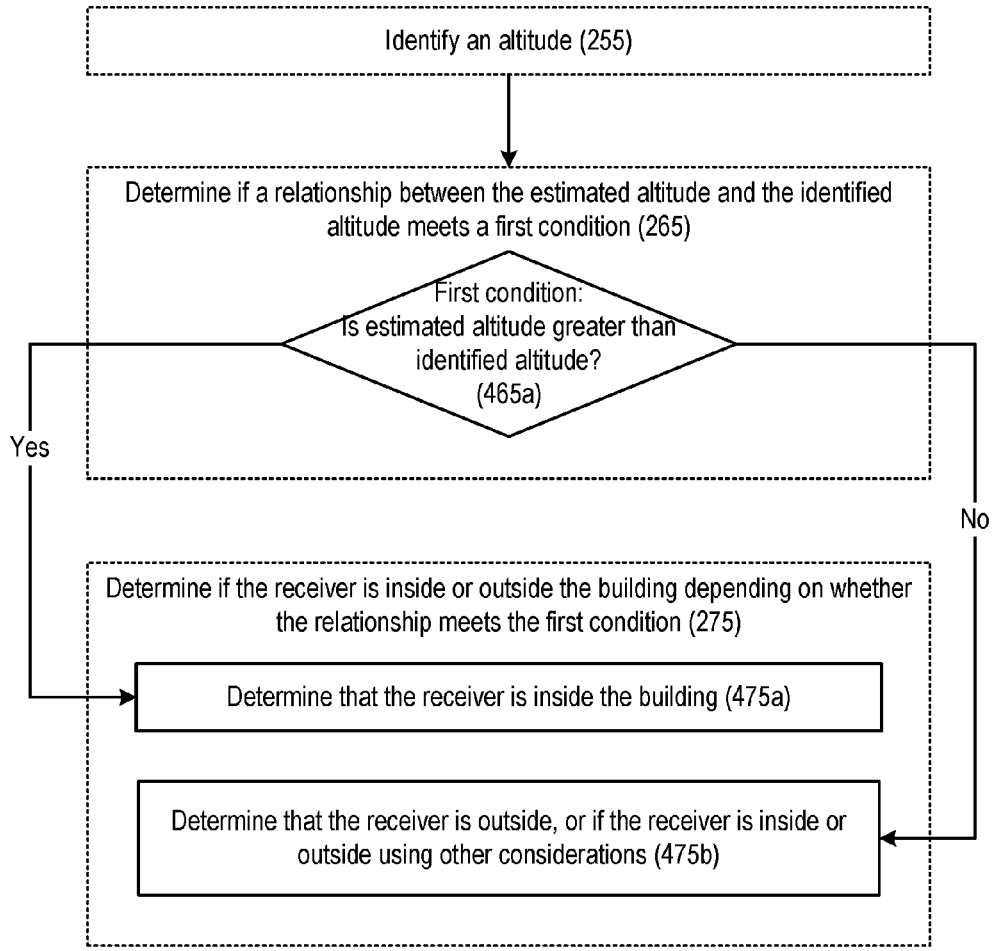
FIG. 4 illustrates functional details for determining if a receiver is inside or outside a building by comparing an estimated altitude to an identified altitude.

Functional details for determining if a receiver is inside or outside a building by comparing an estimated altitude to an identified altitude are shown in FIG. 4. During step 465a, an estimated altitude is compared to an identified altitude to determine if the estimated altitude is greater than the identified altitude. Steps 475a and 475b detail a process for deciding if the receiver 120 is inside or outside the building. Details of steps 475a and 475b are the same as those described for steps 375a and 375b of FIG. 3.

Condition 3: Comparing a Confidence Value to Threshold Criteria

Figure 5:
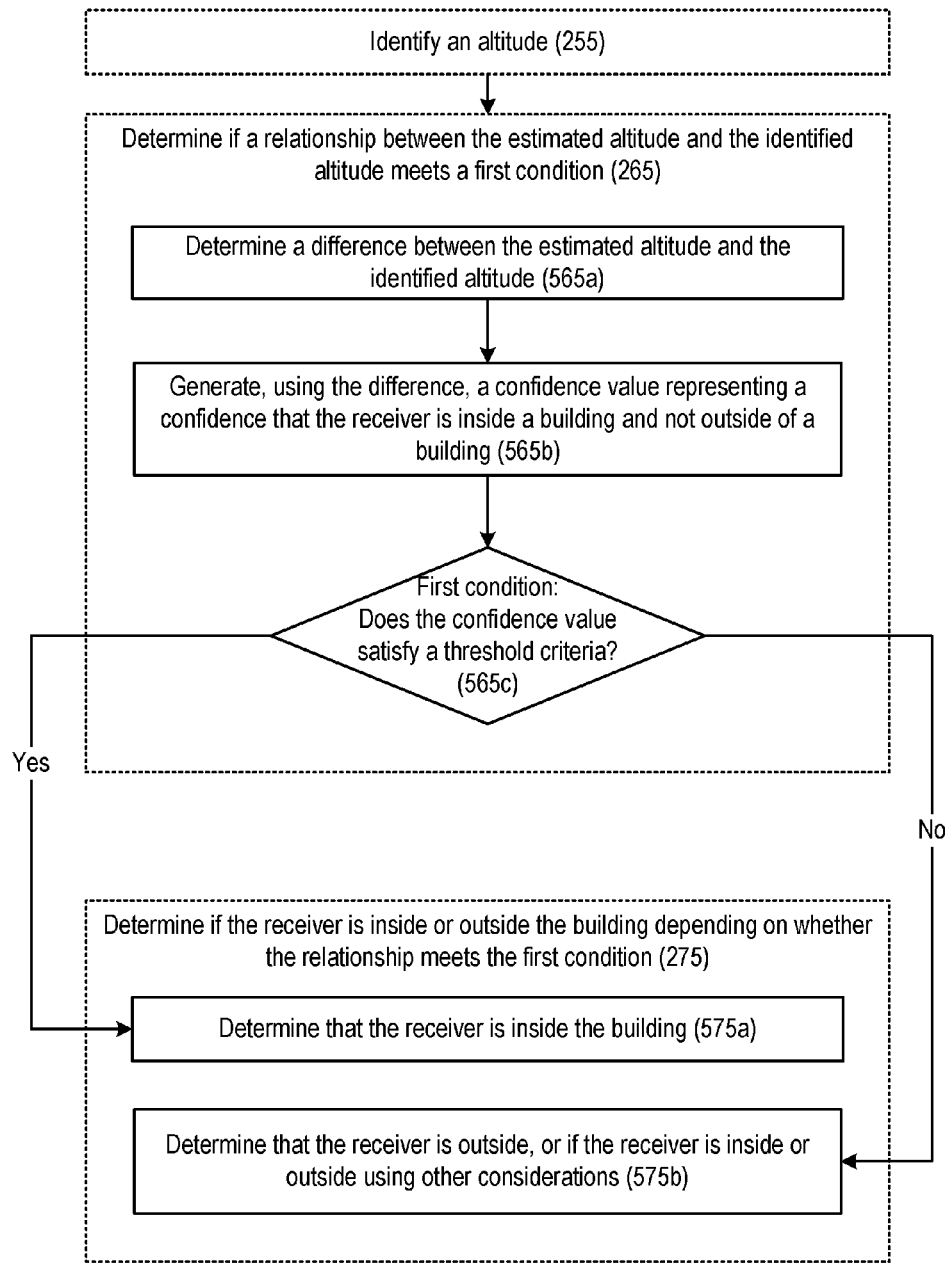
FIG. 5 illustrates functional details for determining if a receiver is inside or outside a building by comparing a generated confidence value to threshold criteria.

Functional details for determining if a receiver is inside or outside a building by comparing a generated confidence value to threshold criteria are shown in FIG. 5. In one embodiment, the altitude of the receiver is used to generate a confidence value which is compared to threshold criteria. This confidence value can be used by itself or combined with more confidence values to determine if the receiver 120 is inside a building.

Steps may occur at step 265 of FIG. 2, and include the steps of: determining a difference between the estimated altitude and the identified altitude (step 565a); generating, using the difference, a confidence value representing a confidence that the receiver 120 is inside a building and not outside a building (step 565b); and determining, as the first condition, whether the confidence value satisfies threshold criteria (step 565c).

In one embodiment, the confidence value is a value belonging to a bounded range of values (e.g. a normalized value). For example, by using the determined difference of the estimated altitude and the identified altitude as an input to a hyperbolic tangent function, the degree of difference from a threshold is mapped to a value bounded to the range of values, as seen below:

$$V_C = \frac{(1.0 - \tanh((altitude_{est} - altitude_{Id}) - \theta)}{4.0} \quad \text{(Equation 3)}$$

Thus, as the confidence value $V_c$ approaches 0 it is more likely that the receiver 120 is inside a building. As the confidence value $V_c$ approaches 0.5, it is less likely that the receiver 120 is inside a building.

The confidence value $V_c$ can then be tested to see if it satisfies threshold criteria during step 565c. For example, the confidence value $V_c$ may be compared to another threshold value (e.g. 0.5), or, as will be described later, the confidence value may be mathematically combined with other confidence values before being compared to threshold criteria.

Steps 575a and 575b detail a process for deciding if the receiver 120 is inside or outside the building. For details of steps 575a and 575b, refer to description of steps 375a and 375b of FIG. 3.

Determining the Inside/Outside State of a Receiver Using Other Considerations As was discussed with reference to steps 375b, 475b and 575b, other considerations may be used in addition to, or instead of, the receiver 120's altitude when determining if the receiver 120 is inside a building. Functional details for determining if a receiver is inside or outside a building using other considerations is shown in FIG. 6.

Figure 6:
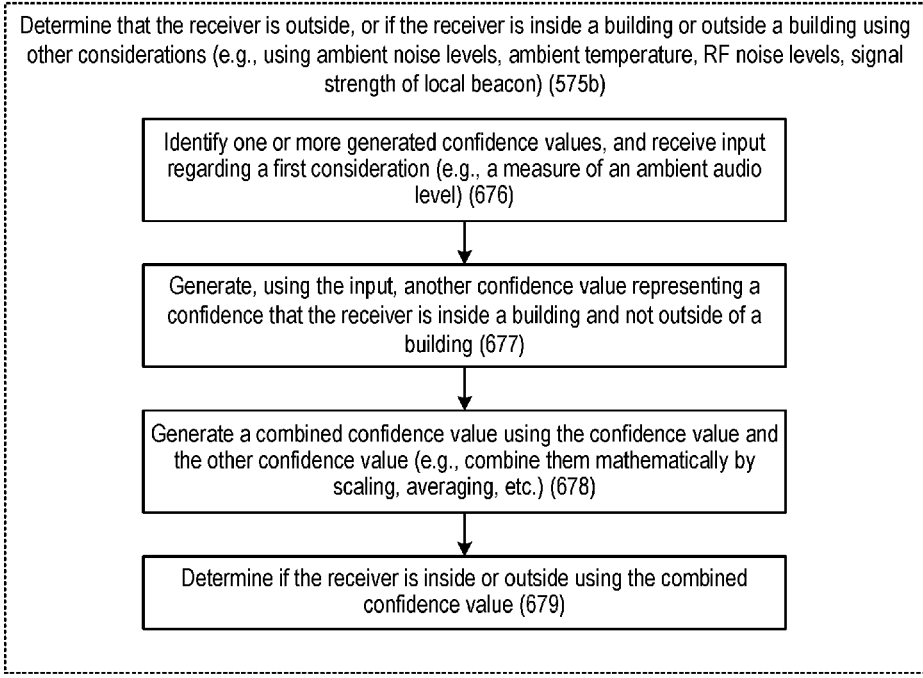
FIG. 6 illustrates functional details for determining if a receiver is inside or outside a building using other considerations.

The process of FIG. 6 includes the steps of: identifying one or more generated confidence values, and receiving input regarding a first consideration (e.g. a measure of an ambient audio level) (step 676); generating, using the input, another confidence value representing a confidence that the receiver 120 is inside a building and not outside a building (step 677); generating a combined confidence value using the confidence value and the other confidence value (step 678); and deciding if the receiver is inside or outside using the combined confidence value (step 679).

Another approach for determining if the receiver is outside or inside based on other considerations is to compare measured characteristics of the receiver's environment with expected characteristics identified for an indoor environment or an outdoor environment.

Since there is likely to be more ambient audio outside a building due to motorized vehicles, construction equipment, plane noise and pedestrians, a high amplitude of ambient audio could indicate that the receiver 120 is not inside a building. In one embodiment, measured amplitude of ambient audio sensed by the receiver is compared to amplitudes of audio expected for an outdoor environment (e.g. amplitudes of sounds from motorized vehicles, construction equipment, or other relatively loud things that are found in an outdoor environment). Alternatively, audio profiles may be determined in terms of periodicity, frequency and change over time. Such profiles could be compared to measured ambient audio, where detected audio that matches expected outside characteristics (e.g. noises at irregular instances in time, noises at certain frequencies, and other characteristics) indicate the receiver is outside.

Other inputs can be used in addition to or instead of ambient audio. In one embodiment, an input includes a signal strength, noise, or other measurable metric of an RF signal (e.g. from a satellite or a terrestrial transmitter). In another embodiment, an input includes one or more atmospheric measurements (e.g. temperature, pressure, humidity, or another measurement). Each input can be compared against expected indoor or outdoor values to determine if the receiver is inside or outside. For example, in some embodiments, the receiver is considered to be outside when: a measured signal strength matches or exceeds a signal strength value that is available in an outdoor environment but not in an indoor environment; a measured signal strength is above a maximum signal strength value that is expected for an indoor environment; an atmospheric measurement is within a range of expected outdoor atmospheric conditions or not within a range of expected indoor atmospheric conditions (e.g. given current weather conditions, time or year, or without such constraints); or comparisons between measurements and expected characteristics for an outdoor or an indoor environment. Of course, the receiver may be considered to be inside when the inverse of any of the preceding examples is determined.

In some embodiments, the above inputs can be converted to a confidence value (e.g. normalized) using methods such as those described at FIG. 6. For example, an average ambient audio amplitude could be compared to a predetermined threshold, and this comparison could be mapped to a confidence level that the receiver is indoors or outdoors. As another example, a temperature measurement made at the receiver may be compared to an outdoor temperature estimate received from a server or remote weather station, and the difference could then be mapped to a confidence level. Or, as a further example, a measure of outdoor ambient RF noise could be used to generate a confidence level.

Using an Inside/Outside Determination to Improve an Estimated Position of a Receiver As discussed earlier, determining that a receiver is inside a building can be used to generate an estimated position of the receiver that is closer to the receiver's true position than an estimated position made without such knowledge. One embodiment of improving an estimated position of a receiver makes use of "bounding polygons" associated with a previously determined location of a building, or a particular floor or floors of a building, located within a threshold distance of the initial estimated position of the receiver. Upon determining that a receiver is inside a building within a threshold distance of an initial estimate position of the receiver, the receiver's estimated position can be projected onto the bounding polygon for that building, as described in more detail below.

Figure 7:
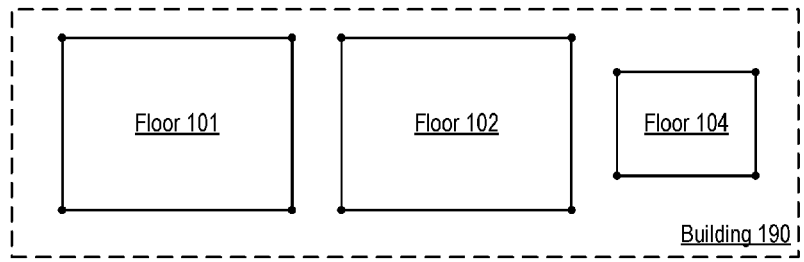
FIG. 7 illustrates bounding polygons associated with three floors of a building.

FIG. 7 illustrates example bounding polygons associated with three floors of the building 190 of FIG. 1. In one embodiment, a bounding polygon is a collection of points positioned in a two-dimensional plane that describe the outline of a building or a floor of a building. As shown, the bounding polygon associated with floor 101 and floor 102 are similar in size and shape, while the bounding polygon associated with floor 104 is smaller in size. A bounding polygon need not describe a quadrilateral. For instance, a bounding polygon may include any shape and size. A bounding polygon may be represented in data as a collection of points representing nodes of the bounding polygon (e.g. a point of intersection of line segments describing the polygon illustrated as black dots), boundaries of the polygon, or an area of the polygon, or by using other means. The points describing a bounding polygon, or another point within the bounding polygon, may be associated with the coordinates of a building (e.g. ENU coordinates, LL or LLA of the building) and in some cases a particular floor of a building.

If it has been previously determined that the receiver 120 is inside a building, another estimated position of the receiver 120 can be generated using a bounding polygon associated with the building to improve a previous estimated position of the receiver 120.

Figure 8:
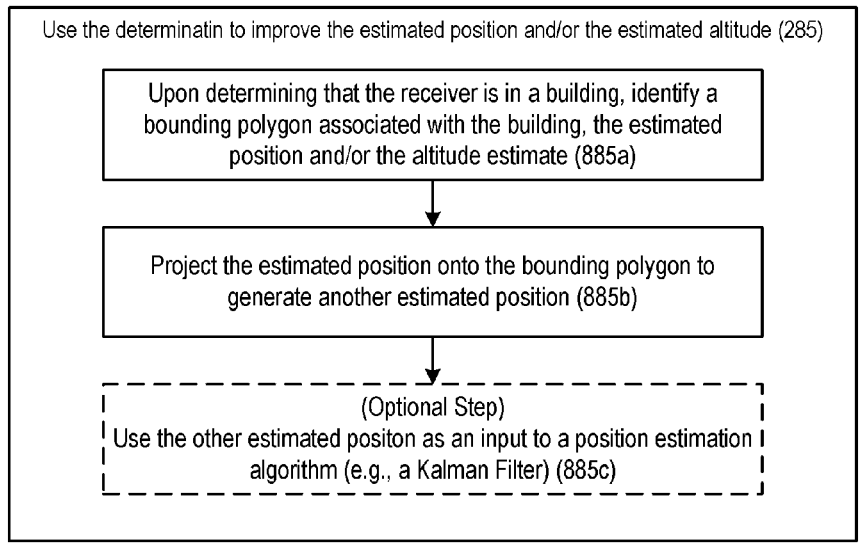
FIG. 8 illustrates functional details for improving the estimated position of a receiver.

Functional details for improving the estimated position of the receiver 120 are shown in FIG. 8. The steps shown in FIG. 8, which could occur at step 285 of FIG. 2, include: identifying a bounding polygon associated with the building, the estimated position, and/or the estimated altitude upon determining that the receiver 120 is inside a building (step 885*a*); projecting the estimated position onto the bounding polygon to generate another estimate of the receiver's position (step 885*b*); and, optionally using the other estimated position as an input to a position estimation algorithm (e.g. a Kalman Filter, a Particle Filter, etc.) (step 885*c*).

The steps of projecting a point (e.g. the 2D or 3D estimated position of the receiver 120) onto a horizontal plane described by a polygon is well known in the art. Different floors of a building may have different exterior bounding polygons. In such an instance, the projection can be done onto the bounding polygon of the floor corresponding to the estimated altitude of the receiver 120. For example, if an initial estimate of the receiver's position places the receiver outside the building 190 of FIG. 1, but at an estimated altitude corresponding to Floor 4 of the building 190, then the bounding polygon for Floor 4 could be identified, and the receiver's position could be projected to the location in the building 190 designated as 'C'.

Figure 9:
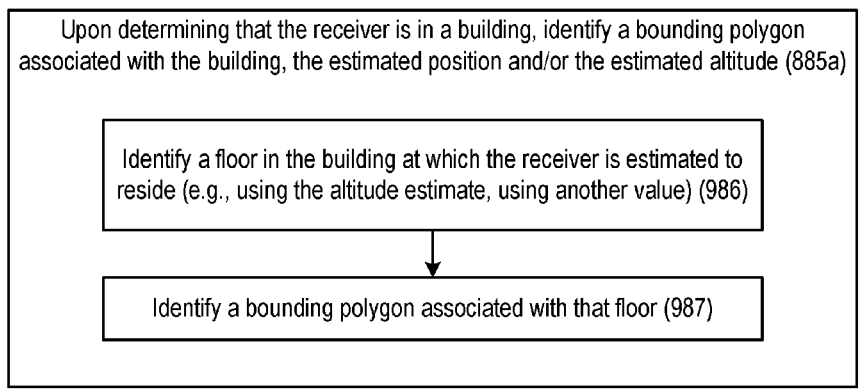
FIG. 9 illustrates functional details for identifying a bounding polygon associated with a building, an estimated position, and/or an estimated altitude.

One embodiment for identifying a bounding polygon associated with the building, the estimated position and/or the estimated altitude are illustrated in FIG. 9. The steps shown in FIG. 9, which could occur at step 885*a* of FIG. 8, include: identifying a floor in the building at which the receiver 120 is estimated to be located (e.g. using the altitude estimate, or using another value) (step 986); and identifying a bounding polygon associated with that floor (step 987).

The floor of the building at which the receiver 120 is estimated to be located may be identified using methods known in the art. One such method includes mapping altitude estimates of the receiver 120 to a specific floor of the building by using a floor-level to altitude look-up table and adjusting for factors like user height (e.g. height at which a user carries the receiver 120). A range (e.g. floor threshold and ceiling threshold) can be assigned around the height of each floor level (absolute height) to map the altitude estimates of the receiver 120 to a floor-level. In the event that there is a gap between the range of one floor and the floor immediately above and/or below it, logic may be implemented to determine the floor based on a floor level blueprint/indoor-map information and a floor location of the receiver 120.

Other Aspects

Methods of this disclosure may be implemented by hardware, firmware or software. One or more non-transitory machine-readable media embodying program instructions that, when executed by one or more machines, cause the one or more machines to perform any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform or are operable to perform different method steps/stages disclosed herein are also contemplated, where the modules are implemented using one or more machines listed herein or other suitable hardware.

When two things (e.g. modules or other features) are "coupled to" each other, those two things may be directly connected together (e.g. shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g. data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g. a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems (e.g. satellites, other transmitters, receivers, a server); RF front end module(s) with circuitry components (e.g. analog/digital logic and power circuitry, tuning circuitry, buffer and power amplifiers, and other components as is known in the art or otherwise disclosed herein); processing module(s) for performing signal processing (e.g. generating signals for transmission to other systems at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g. pressure, temperature, humidity, wind, or other conditions); and/or interface module(s) for exchanging information with other systems via other links other than a radio link. Signals transmitted by a transmitter may carry different information that, once determined by a receiver or a server, may identify the following: the transmitter that transmitted the signal; the location (LLA) of that transmitter; pressure, temperature, humidity, and other conditions at or near that transmitter; and/or other information.

It is noted that the term "positioning system" may refer to satellite systems (e.g. Global Navigation Satellite Systems (GNSS) like GPS, GLONASS, Galileo, and Compass/Beidou), terrestrial systems, and hybrid satellite/terrestrial systems.

Certain aspects disclosed herein relate to positioning modules that estimate the positions of receivers—e.g. where the position is represented in terms of: latitude, longitude, and/or altitude coordinates; x, y, and/or z coordinates; angular coordinates; or other representations. Positioning modules use various techniques to estimate the position of a receiver, including trilateration, which is the process of using geometry to estimate the position of a receiver using distances traveled by different "positioning" (or "ranging") signals that are received by the receiver from different beacons (e.g. terrestrial transmitters and/or satellites). If position information like the transmission time and reception time of a positioning signal from a beacon are known, then the difference between those times multiplied by speed of light would provide an estimate of the distance traveled by that positioning signal from that beacon to the receiver. Different estimated distances corresponding to different positioning signals from different beacons can be used along with position information like the locations of those beacons to estimate the position of the receiver. Positioning systems and methods that estimate a position of a receiver based on positioning signals from beacons (e.g. transmitters, and/or satellites) are described in co-assigned U.S. Pat. No. 8,130,141, issued Mar. 6, 2012, and U.S. Patent Application Publication No. US 2012/0182180, published Jul. 19, 2012.

RELATED APPLICATIONS

This application relates to U.S. Patent Application Ser. No. 62/233,952, filed 2015 Sep. 28, entitled USING ALTITUDE ESTIMATES TO AID INDOOR-OUTDOOR DETECTION AND RECEIVER LOCATION ADJUSTMENTS, the content of which is hereby incorporated by reference herein in its entirety.

The invention claimed is:

1. A method for improving an estimated position using altitude-based indoor or outdoor detection, the method comprising:
   determining an estimated position of a receiver;
   determining an estimated altitude of the receiver;
   identifying an altitude associated with the estimated position;
   determining if a relationship between the estimated altitude and the identified altitude meets a first condition;
   determining if the receiver is inside or outside a building depending on whether the relationship meets the first condition; and
   improving one or both of the estimated position or the estimated altitude based on determining whether the receiver is inside or outside,
   wherein determining if the receiver is inside or outside the building depending on whether the relationship meets the first condition comprises (i) determining that the receiver is inside the building if the relationship meets the first condition, and (ii) if the relationship does not meet the first condition:
      identifying one or more generated confidence values;
      receiving input regarding a first consideration;
      generating a second confidence value using the input, wherein the second confidence value represents a confidence that the receiver is inside the building and not outside the building;
      generating a combined confidence value using the one or more generated confidence values and the second confidence value; and
      determining if the receiver is inside or outside the building using the combined confidence value.

2. The method of claim 1, wherein identifying an altitude associated with the estimated position comprises:
   identifying a point of reference using the estimated position;
   identifying an altitude associated with the point of reference; and
   using the altitude of the point of reference as the identified altitude.

3. The method of claim 2, wherein the point of reference has location parameters that are within a threshold distance of the estimated position.

4. The method of claim 1, wherein determining if a relationship between the estimated altitude and the identified altitude meets a first condition comprises:
   determining an altitude difference between the estimated altitude and the identified altitude,
   wherein the first condition is met if the altitude difference is greater than a threshold value.

5. The method of claim 1, wherein determining if a relationship between the estimated altitude and the identified altitude meets a first condition comprises:
   determining if the estimated altitude is greater than the identified altitude,
   wherein the first condition is met if the estimated altitude is greater than the identified altitude.

6. The method of claim 1, wherein determining if a relationship between the estimated altitude and the identified altitude meets a first condition comprises:
   determining an altitude difference between the estimated altitude and the identified altitude; and
   generating, using the altitude difference, a confidence value representing a confidence that the receiver is inside the building and not outside the building,
   wherein the first condition is met if the confidence value satisfies a threshold criteria.

7. The method of claim 1, wherein one of the one or more generated confidence values is generated using an altitude difference between the estimated altitude and the identified altitude.

8. The method of claim 1, wherein the input regarding the first consideration is a measure of an ambient audio level.

9. The method of claim 1, wherein the combined confidence value is generated by averaging the one or more generated confidence values and the second confidence value.

10. The method of claim 1, wherein determining if the receiver is inside or outside the building depending on whether the relationship meets the first condition comprises:
    determining, if the relationship does not meet the first condition, whether the receiver is outside or inside the building based on one or more other considerations,
    wherein the one or more other considerations includes whether one or more of a measure of ambient audio, a measure of ambient temperature, a measure of RF noise, or a measure of signal strength match a corresponding threshold value of audio, temperature, RF noise, or signal strength identified for an indoor environment or an outdoor environment.

11. The method of claim 1, wherein improving one or both of the estimated position or the estimated altitude based on determining whether the receiver is inside or outside comprises:
    using the estimated altitude, or the estimated position, to identify a bounding polygon associated with a floor in the building; and
    projecting the estimated position of the receiver onto the bounding polygon to generate a second estimate of the position of the receiver.

12. The method of claim 11, wherein the second estimate of the position of the receiver is used as an input to a position estimation algorithm.

13. The method of claim 12, wherein the position estimation algorithm comprises a Kalman Filter.

14. The method of claim 11, wherein using the estimated altitude, or the estimated position, to identify a bounding polygon associated with a floor in the building comprises:
    identifying a particular floor in the building that matches the estimated altitude of the receiver; and
    identifying a particular bounding polygon associated with that particular floor,
    wherein the particular bounding polygon is the identified bounding polygon.

15. One or more non-transitory machine-readable media embodying program instructions that, when executed by one or more machines, cause the one or more machines to perform a method for improving an estimated position using altitude-based indoor or outdoor detection, the method comprising:

determining an estimated position of a receiver;

determining an estimated altitude of the receiver;

identifying an altitude associated with the estimated position;

determining if a relationship between the estimated altitude and the identified altitude meets a first condition;

determining if the receiver is inside or outside a building depending on whether the relationship meets the first condition; and improving one or both of the estimated position or the estimated altitude based on determining whether the receiver is inside or outside, wherein determining if the receiver is inside or outside the building depending on whether the relationship meets the first condition comprises (i) determining that the receiver is inside the building if the relationship meets the first condition, and (ii) if the relationship does not meet the first condition:

identifying one or more generated confidence values;

receiving input regarding a first consideration;

generating a second confidence value using the input, wherein the second confidence value represents a confidence that the receiver is inside the building and not outside the building;

generating a combined confidence value using the one or more generated confidence values and the second confidence value; and determining if the receiver is inside or outside the building using the combined confidence value.

16. The one or more non-transitory machine-readable media of claim 15, wherein identifying an altitude associated with the estimated position comprises:

identifying a point of reference using the estimated position;

identifying an altitude associated with the point of reference; and using the altitude of the point of reference as the identified altitude.

17. The one or more non-transitory machine-readable media of claim 16, wherein the point of reference has location parameters that are within a threshold distance of the estimated position.

18. The one or more non-transitory machine-readable media of claim 15, wherein determining if a relationship between the estimated altitude and the identified altitude meets a first condition comprises:

determining an altitude difference between the estimated altitude and the identified altitude, wherein the first condition is met if the altitude difference is greater than a threshold value.

19. The one or more non-transitory machine-readable media of claim 15, wherein determining if a relationship between the estimated altitude and the identified altitude meets a first condition comprises:

determining if the estimated altitude is greater than the identified altitude, wherein the first condition is met if the estimated altitude is greater than the identified altitude.

20. The one or more non-transitory machine-readable media of claim 15, wherein determining if a relationship between the estimated altitude and the identified altitude meets a first condition comprises:

determining an altitude difference between the estimated altitude and the identified altitude; and generating, using the altitude difference, a confidence value representing a confidence that the receiver is inside the building and not outside the building, wherein the first condition is met if the confidence value satisfies a threshold criteria.

21. The one or more non-transitory machine-readable media of claim 15, wherein one of the one or more generated confidence values is generated using an altitude difference between the estimated altitude and the identified altitude.

22. The one or more non-transitory machine-readable media of claim 15, wherein the input regarding the first consideration is a measure of an ambient audio level.

23. The one or more non-transitory machine-readable media of claim 15, wherein the combined confidence value is generated by averaging the one or more generated confidence values and the second confidence value.

24. The one or more non-transitory machine-readable media of claim 15, wherein determining if the receiver is inside or outside the building depending on whether the relationship meets the first condition comprises:

determining, if the relationship does not meet the first condition, whether the receiver is outside or inside the building based on one or more other considerations, wherein the one or more other considerations includes whether one or more of a measure of ambient audio, a measure of ambient temperature, a measure of RF noise, or a measure of signal strength match a corresponding threshold value of audio, temperature, RF noise, or signal strength identified for an indoor environment or an outdoor environment.

25. The one or more non-transitory machine-readable media of claim 15, wherein improving one or both of the estimated position or the estimated altitude based on determining whether the receiver is inside or outside comprises:

using the estimated altitude, or the estimated position, to identify a bounding polygon associated with a floor in the building; and projecting the estimated position of the receiver onto the bounding polygon to generate a second estimate of the position of the receiver.

26. The one or more non-transitory machine-readable media of claim 25, wherein the second estimate of the position of the receiver is used as an input to a position estimation algorithm.

27. The one or more non-transitory machine-readable media of claim 26, wherein the position estimation algorithm comprises a Kalman Filter.

28. The one or more non-transitory machine-readable media of claim 25, wherein using the estimated altitude, or the estimated position, to identify a bounding polygon associated with a floor in the building comprises:

identifying a particular floor in the building that matches the estimated altitude of the receiver; and identifying a particular bounding polygon associated with that particular floor, wherein the particular bounding polygon is the identified bounding polygon.

\* \* \* \* \*